Sept. 6, 1932.      L. J. VAN GUELPEN      1,876,111
CHILD'S VEHICLE WITH RECLINING BACK
Filed Aug. 23, 1928      3 Sheets-Sheet 1

Inventor
Louis J. Van Guelpen
By Murray and Zugelter
Attorneys

Sept. 6, 1932.   L. J. VAN GUELPEN   1,876,111
CHILD'S VEHICLE WITH RECLINING BACK
Filed Aug. 23, 1928   3 Sheets-Sheet 2
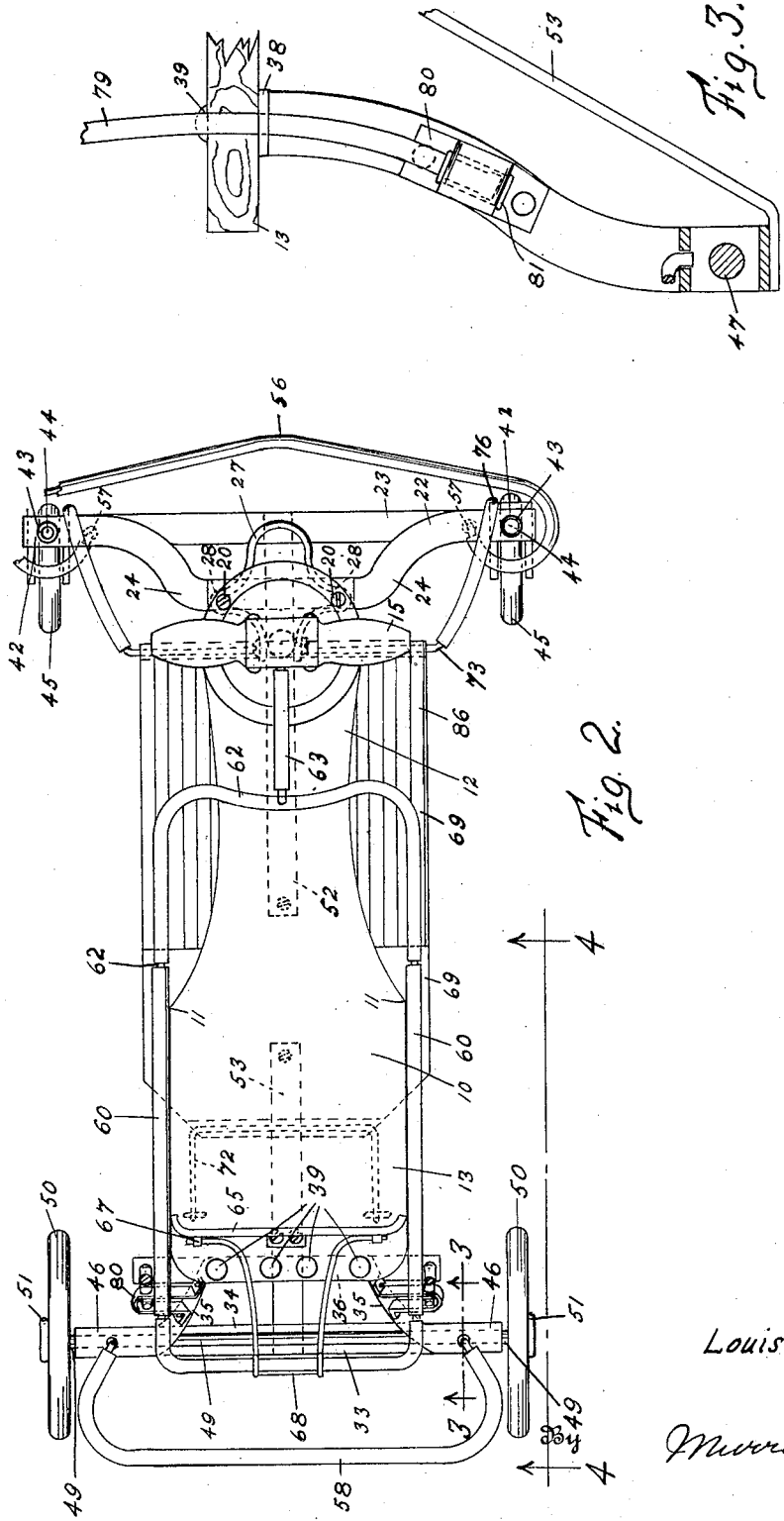
Inventor
Louis J. Van Guelpen
Murray and Zugelter
Attorneys

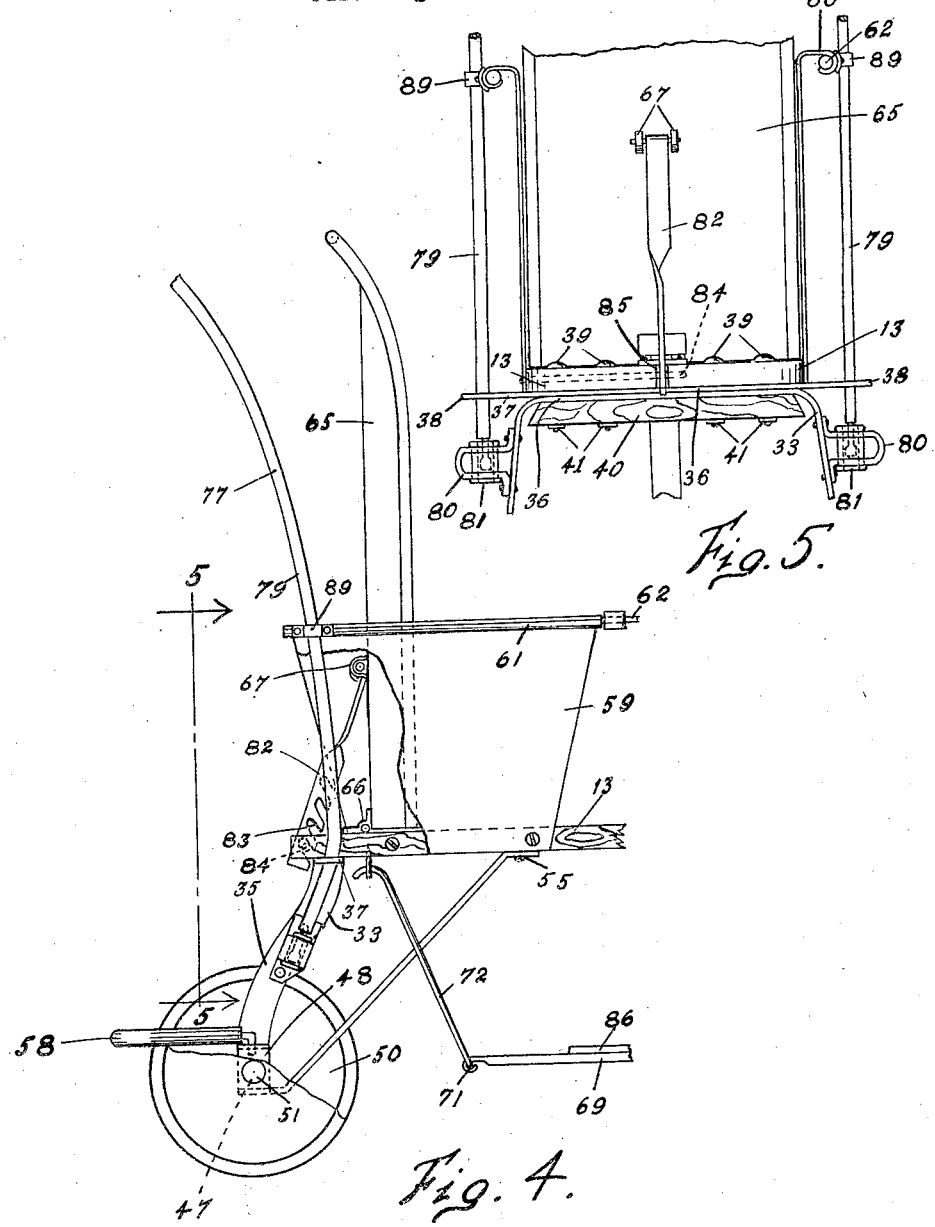

Patented Sept. 6, 1932

1,876,111

UNITED STATES PATENT OFFICE

LOUIS J. VAN GUELPEN, OF CINCINNATI, OHIO, ASSIGNOR, BY MESNE ASSIGNMENTS, TO IVER JOHNSON'S ARMS AND CYCLE WORKS, OF FITCHBURG, MASSACHUSETTS, A CORPORATION OF MASSACHUSETTS

CHILD'S VEHICLE WITH RECLINING BACK

Application filed August 23, 1928. Serial No. 301,585.

This invention relates to a child's vehicle of the class commonly known as "walkers" and which in one use is foot-propelled by the child, and in another use is either pushed or pulled by an attendant.

An object of the invention is to combine in one vehicle the uses and advantages both of a "walker" and of a baby carriage.

Another object is to provide a vehicle which is entirely safe in all circumstances of its use.

Another object is to provide such a device which when used in the house will not deface or scar furniture, etc., with which it comes in contact.

Another object is to provide a baby walker which provides an adjustable back rest so that the child in the vehicle may be supported in various positions.

These and other objects are attained by the means described herein and disclosed in the accompanying drawings, in which:

Fig. 2 is a plan view of the vehicle.

Fig. 3 is a view on line 3—3 of Fig. 2.

Fig. 4 is a view on line 4—4 of Fig. 2, showing a modification of certain parts, portions being broken away.

Fig. 5 is a view on line 5—5 of Fig. 4, with parts broken away.

Figure 1:
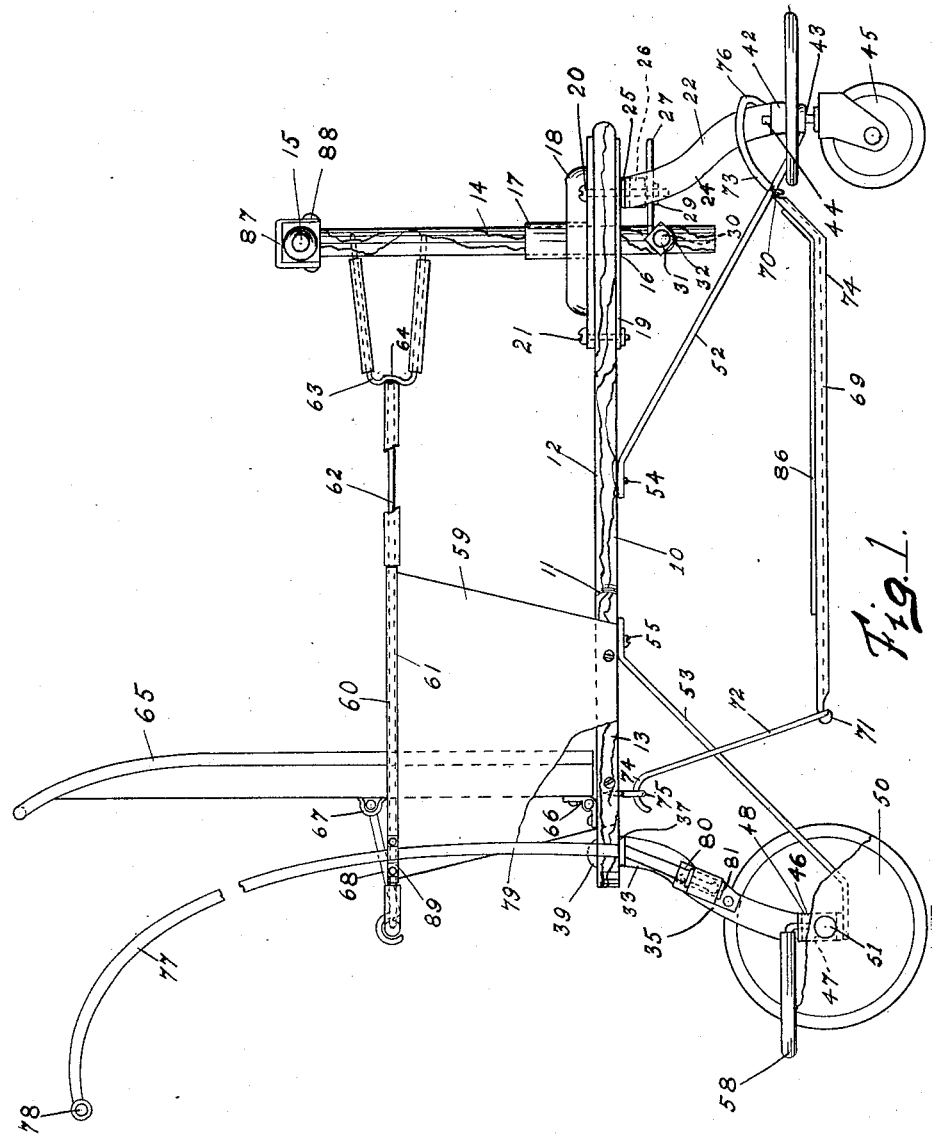
Fig. 1 is a side elevational view of the vehicle.

The device comprises the seat 10, preferably of wood, both sides of which are inwardly cut from points 11 forward, to form the straddle section 12, and the rear section 13. The handle 14 with top cross piece 15, extends through perforation 16 in section 12 adjacent the forward end thereof. The metal band 17, upper flange 18 and lower flange 19, retain handle 14 rigidly upright. Flanges 18 and 19 are anchored by forward screw bolts 20 and rear screw bolt 21 passing through section 12 and both of said flanges. The front support frame 22 is an integral shaped metal strip, having the lower horizontal cross-portion 23 and the inwardly offset portions 24 which are bent upwardly and inwardly. A small section at either end of the strip forming frame 22 is brought into parallelism with horizontal section 23, the two ends having been so bent as to meet above the midway point of section 23, and it is by means of screw bolts 20 passing first through section 12, and then through perforations in said endwise horizontal section of portions 24 that said frame 22 is secured to section 12. A small perforated strip 25 is positioned on screw bolts 20 above and in contact with the said horizontal sections of portions 24 and a block 26 abuts these same sections on their under sides, the block being likewise perforated and positioned on screw-bolts 20. Against the under side of block 26 is secured the rigid wire hook member 27, having narrow loop portions 28 through which, in turn, bolts 20 extend, and on the ends of which bolts suitable nuts 29 are now tightened. The ends of hook member 27, are turned inwardly and bent to form vertical eyes 30 which contact handle 14 at opposite sides adjacent the lower end thereof. Through these eyes 30 and an aligned transverse perforation in handle 14, a bolt 31 and nut 32 are secured to bind handle 14 against rotation by means of cross-piece 15. Rear support frame 33 is formed similarly to frame 22, and comprises the lower horizontal portion 34, the inwardly offset portions 35 and the upper horizontal sections 36. A metal strip 37 whose perforated ends 38 equally protrude beyond the side edges of section 13, is positioned upon the upper horizontal portions 36. Bolts 39 pass through section 13, through strip 37, through the upper horizontal portions 36 of frame 33 and through block 40, being thereafter tightened by means of nuts 41.

Double wheel-bearings 42 are formed on frame 22 by bringing portions 24 into spaced parallel relationship with horizontal portion 23 for a short distance, after which, as before explained, portions 24 are bent upwardly. Aligned perforations 43 are made through bearings 42 and pin-bearings 44 secured therein. Rubber-tired castor wheels 45 of the "snap-in" type are removably held by the pin-bearings 44.

The rear axle-bearings 46 are formed similarly to front wheel-bearings 42. The perforations 47 however are made in the short side-walls 48 of the rear bearings 46 and the axle-shaft 49 is non-revolubly secured therein. The rubber-tired rear wheels 50 turn upon axle 49 and are held thereon by suitable abutments (not shown) on the axle-ends, over which abutments rubber caps 51 are placed.

Support strips 52 and 53 are fixed to the under-side mid-points of front and rear portions 23 and 34 respectively, their upper ends being screwed to the underside of seat 10 as at 54 and 55.

Front bumper 56, of heavy wire, covered with rubber tubing is formed and positioned by first bending the ends of the wire so as to pass around the outer points of frame 22 and then, after bending the extreme ends of the wire downwardly, by inserting these extreme ends through perforations 57 in portion 23 of the frame, the butt ends being thereafter split or spread to prevent their withdrawal.

Rear bumper 58, is secured similarly in the short upper horizontal portions of the axle-bearings 46. This bumper extends rearwardly beyond the rear lines of the body and wheels of the vehicle. It, too, is covered with heavy rubber tubing.

On the side edges of rear section 13 are secured the side sections 59, the top edges of which are first turned outwardly to form flanges 60 and then rolled under upon themselves to form beads 61 through which latter the wire frame 62, extends. Wire frame 62, in the first modification continues rearwardly and forwardly of flanges 60, having a substantially rectangular form. Flanges 60 serve as arm rests and obviate the discomfort and possible harm resulting from merely vertical arm rests.

A U-shaped rigid wire member, 63, also rubber covered except at its base has its ends sunk into handle 14, one end above the other. Its base is given an acute inward bend at 64 into which depression the forward end of frame 62 is snapped and so supported.

A metal back rest 65 is hinged at 66 to section 13. Aligned bearings 67 are provided on the rear of back rest 65, such as by striking out small sections thereof. A U-shaped spring wire hook member 68, its ends bent to form pins, is pivotally mounted in bearings 67. When it is desired to retain the back rest upright the clamp member 68 is positioned or hooked upon the rear portion of wire frame 62. When a reclining position is desired, the member 68 is unhooked from frame 62 and allowed to hang from its trunnions and the back rest is moved backwardly and supported by the frame 62.

A rectangular foot rest 69 having channel 70 at its forward edge and channel 71 at its rear edge is suspended beneath the vehicle by means of rear straps 72 and front straps 73. Front straps 73 and rear straps 72 are single pieces the mid-portions of which pass through channels 70 and 71 respectively, to support the foot rest. The forward ends 76 of straps 73 are hook-shaped and clamp down upon wheel bearings 42. Ends 76 too are rubber-covered. The front end of foot rest 69 abuts the support strip 52, by which upward movement and consequent displacement of foot rest 69, due to contact with curbs, stairs, etc., is prevented. In this connection it is to be noted that normal removal of foot rest 69 is accomplished by pivoting straps 73 backwardly and upwardly so that their front ends 76 are disengaged from wheel bearings 42. Side edges 74 of foot rest 69 are bent under to avoid sharpness.

Handle 77 comprises top bar 78 and side bars 79. It is removably positioned thus: side bars 79 extend first through suitable clamps 89 which are secured to flanges 60 adjacent the rear ends thereof. Bars 79 then pass through perforations adjacent the ends 38 of strip 37. U-shaped members 80 fixed to portions 35, protrude outwardly from rear frame 33, and retain the clasps or holders 81 in position. Clasps 81 removably receive the lower ends of bars 79 after the latter have been inserted through the end perforations in strip 37. The removable connection of bars 79 to clasps 81 may be that of ball and clasp as indicated clearly in Figures 3 and 5.

A modification of back rest 65 is shown in Figs. 4 and 5. Here, instead of the clamp member 68, the adjustable support arm 82, is used. The slots 83 fit upon the rod 84 which is secured in the slot 85 made in the rear of section 13. Frame 62, in this modification does not extend across the rear of the vehicle but is cut off at each side just behind the side sections 59. Back rest 65 may, in this modification, be completely lowered to a horizontal position, support arm 82 being allowed to hang down at the rear of the vehicle.

A rubber mat 86 is secured to the top face of foot rest 69 to prevent slipping of the child's feet. A rubber piece 87 is secured at 88 to the middle portion of cross-piece 15 to obviate any harm that might occur to the child in applying its mouth to a convenient place such as this.

It is to be noted that all parts most handled by the child and all parts that protrude beyond the body lines of the vehicle are rubber covered, making for safety to the child and the elimination of harm to furniture, etc.

It is evident that when the foot rest 69 and handle 77 are removed the vehicle is ready for use as a walker and that, with these parts in position, all the advantages of a baby carriage are present, including the adjusting of the back rest 65 from an upright to a horizontal position, and points intermediate.

Finally, this vehicle has a prolonged usefulness in that seat 10 may be raised higher above the floor to compensate for the child's growth. This is accomplished by positioning the blocks 26 in the front and 40 in the rear, above rather than below the sections 24 and 35 respectively of the front and rear support frames. It is likewise obvious that the back support 65 can be readily removed by unscrewing the hinge 66 from its engagement with seat 10.

What is claimed is:

1. In a child's vehicle comprising a seat tractionally supported and having vertical side sections supporting a continuous wire frame, a back rest pivotally secured to the seat between the side sections and within the wire frame and having pivotal hook means on its rear face, said hook means being adapted to co-operate with the wire frame to maintain the back rest in an upright position and to be disengaged from such co-operation to allow the back rest to be supported by the wire frame.

2. In a child's vehicle comprising a tractionally supported seat with side sections extending above the seat and supporting a continuous wire frame, a back rest pivotally secured to the seat between the side sections and within the wire frame; and a hook member pivoted at one end in bearings on the rear face of said back rest, the opposite end of the hook member being hook-shaped and adapted to engage the wire frame whereby to support the back rest.

3. In combination with a tractionally supported seat, metal side sections secured to and extending above the seat, said sections being bent outwardly at the top to form horizontal flanges adapted to serve as arm rests, the extreme outer edges of said flanges being turned inwardly upon themselves to form channels, a wire inserted through the channels with its ends connected to form a connection between the forward ends of said sections and between the rearward ends of said sections to provide an inclosed area, an adjustable back rest hinged upon the seat, and means cooperating with the back rest and the connection between the rearward ends of said section for supporting the rest in adjusted positions.

4. In a baby walker, the combination of a seat, a wire member spaced above and extending transversely of the seat rearwardly beyond said seat in substantially parallel relation thereto, a back rest pivotally mounted on the seat and extending upwardly from said seat in front of said wire member with the upper edge of said back rest projecting above the plane of the wire member, and means attached to the back rest for holding said back rest in a substantially upright position, said back rest engaging and being supported by said wire member when said means is inoperative to position the back rest in a rearward inclined relation to the seat.

5. A child's vehicle comprising a tractionally supported straddle seat, side members secured to and extending above said seat, a wire member connecting the rearward ends of said side members adjacent the top thereof, said wire member extending rearwardly beyond said seat and in substantially parallel relation to said seat, a back rest hingedly mounted on the seat and extending upwardly therefrom with the upper edge of said back rest projecting above the plane of the wire member, and a pivotally mounted member intermediate the top and bottom of the back rest for cooperation with the wire member to retain the back rest in a substantially upright position, said back rest engaging and being supported by said wire member in inclined relation to the seat when said pivotally mounted member is inoperative.

In testimony whereof, I have hereunto subscribed my name this 22nd day of August, 1928.

LOUIS J. VAN GUELPEN.